United States Patent [19]
Utsumi

[11] Patent Number: 6,141,299
[45] Date of Patent: Oct. 31, 2000

[54] APPARATUS AND METHOD FOR REPRODUCING INFORMATION DATA OF DIFFERENT FORMATS FROM A MULTI-LAYER OPTICAL DISC

[75] Inventor: Yoshimasa Utsumi, Tokyo, Japan

[73] Assignee: Sony Corporation, Tokyo, Japan

[21] Appl. No.: 09/283,185

[22] Filed: Apr. 1, 1999

[30] Foreign Application Priority Data

Apr. 9, 1998 [JP] Japan .................................. 10-097515

[51] Int. Cl.⁷ .................................................. G11B 17/22
[52] U.S. Cl. ......................... 369/32; 369/94; 369/275.1
[58] Field of Search ............................. 369/275.1, 275.3, 369/94, 32, 58, 47, 48; 386/125, 126

[56] References Cited

U.S. PATENT DOCUMENTS

| | | |
|---|---|---|
| 5,235,575 | 8/1993 | Han . |
| 5,696,743 | 12/1997 | Kawasaki ................................. 369/32 |
| 5,706,269 | 1/1998 | Ogura et al. . |
| 5,781,516 | 7/1998 | Yamada ................................. 369/32 |
| 5,828,648 | 10/1998 | Takasu et al. ........................ 369/275.1 |
| 5,881,032 | 3/1999 | Ito et al. ................................... 369/32 |
| 5,920,527 | 7/1999 | Aoki ......................................... 369/32 |

FOREIGN PATENT DOCUMENTS

| | | |
|---|---|---|
| 0292942 | 11/1988 | European Pat. Off. . |
| 0724256 | 7/1996 | European Pat. Off. . |
| 0777227 | 6/1997 | European Pat. Off. . |
| 0817195 | 1/1998 | European Pat. Off. . |
| 0818784 | 1/1998 | European Pat. Off. . |

*Primary Examiner*—Tan Dinh
*Attorney, Agent, or Firm*—Jay H. Maioli

[57] ABSTRACT

An apparatus for reproducing signals from a multi-layer disc with a first layer containing recorded high-quality digital audio data and a second layer containing recorded low-quality digital audio data. In this apparatus, the high-quality digital audio data and the low-quality digital audio data reproduced from the first and second layers respectively are once stored in a memory, and then the high-quality digital audio data and the low-quality digital audio data having the same content are reproduced alternately, from memory so that their tone qualities can be compared and evaluated distinctly.

14 Claims, 3 Drawing Sheets

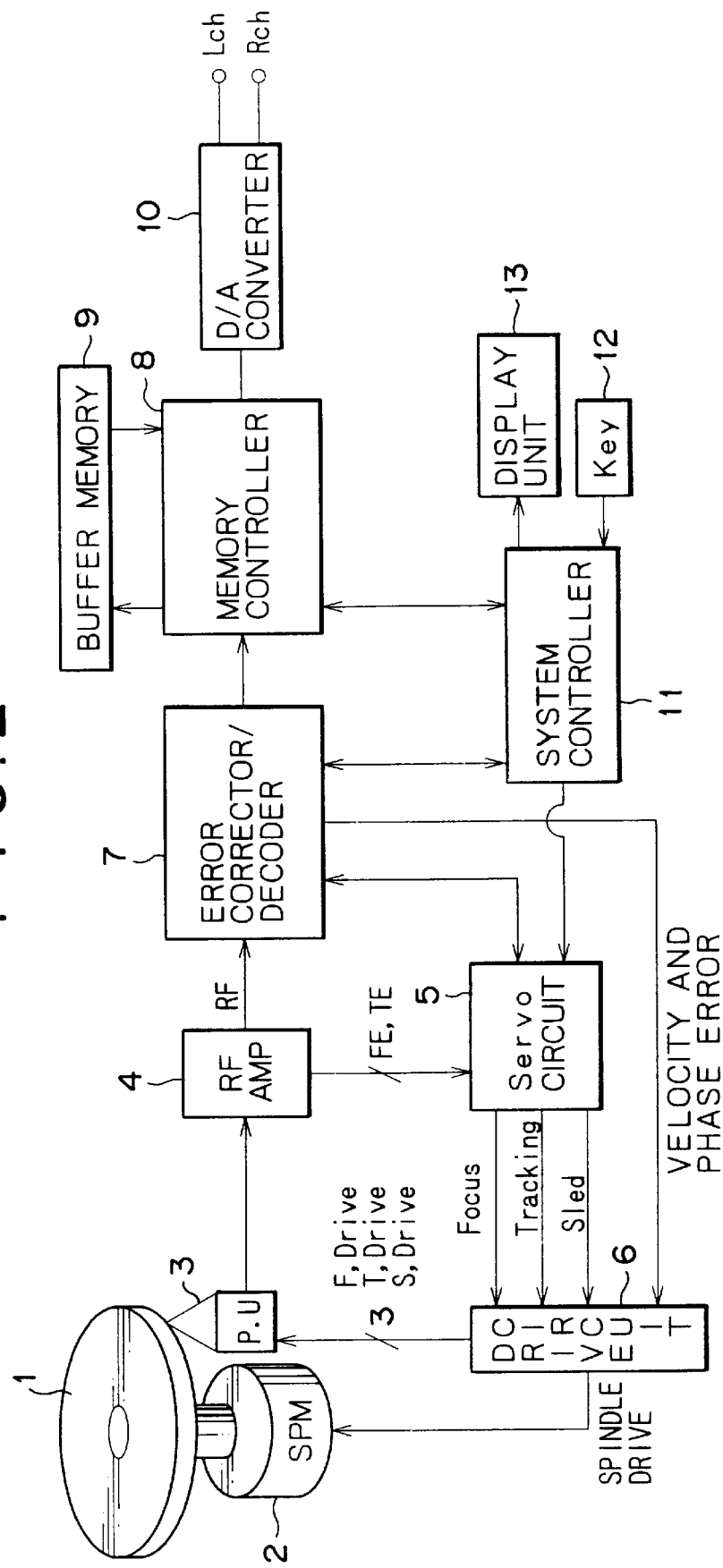

APPARATUS AND METHOD FOR REPRODUCING INFORMATION DATA OF DIFFERENT FORMATS FROM A MULTI-LAYER OPTICAL DISC

BACKGROUND OF THE INVENTION

1. Field of the Invention

The present invention relates to an apparatus and a method for reproducing a multi-layer disc which has a first layer containing low-quality recorded data and a second layer containing high-quality recorded data, and more particularly to those capable of comparing such high-quality and low-quality data with each other.

2. Description of the Related Art

There is currently proposed a novel type of optical disc termed DVD (Digital Versatile Disc) greater in capacity than the known compact disc (hereinafter referred to as CD).

On a DVD which is an optical disc of 12 cm in diameter, information is recorded at a track pitch of 0.8 μm narrower than an ordinary track pitch of 1.6 μM employed on the conventional CD, and the wavelength of a semiconductor laser is changed from 780 nm on the CD to 630 nm, and the EFM (Eight-to-Fourteen Modulation) adopted for the CD is improved to consequently realize high-density recording which corresponds to information of approximately 4 G bytes on one side of the disc.

Relative to such DVD, a multi-layer structure having two recording layers is lately proposed.

As disclosed, for example, in U.S. Pat. No. 5,706,263 filed on Mar. 26, 1997, the present applicant proposed a high-quality digital audio disc having a multi-layer structure where a 16-bit digital audio signal sampled at a frequency of 44.1 kHz is recorded in one layer, while 1-bit quantized digital audio signal is recorded in another layer after being processed through ΣΔ modulation at a very high sampling frequency of 2.842 MHz which is 16 times the above frequency of 44.1 kHz.

The contents of signals to be recorded in such two layers are mutually the same (e.g., same music piece). Therefore, data of the same contents are recorded as normal-quality data of a CD level in one layer while being recorded as higher-quality data in the other layer.

Since such a multi-layer disc has one layer containing a recorded 16-bit digital audio signal sampled at 44.1 kHz, it is reproducible by any of ordinary compact disc players available currently in the general market.

Further in any apparatus adapted for reproduction of both layers, signals are reproducible properly from the two layers, so that any of a multiplicity of compact discs diffused widely now can be reproduced and still the novel multi-layer disc mentioned above can be reproduced as well.

Any of compact discs available in general and the novel multi-layer disc are substantially the same in external appearance. And in one of the layers of the multi-layer disc, data is recorded in conformity with the format of a compact disc so as to maintain down-compatibility therewith, i.e., digital audio signal processed through sampling at 44.1 kHz, 16-bit quantization and EFM is recorded.

For the purpose of explanatory convenience in the following description, one layer containing recorded data of the CD format will be referred to as a CD layer, and another layer containing recorded 1-bit digital audio signal processed at a sampling frequency of 2.842 MHz through ΣΔ modulation will be referred to as an HD (High-Definition) layer.

In comparing the tone qualities of different types of recording media, i. e., when reproducing the same music piece or the like from two recording media of an analog record and a compact disc for example to evaluate the tone qualities thereof, it has been necessary heretofore to execute the customary procedure of first connecting a record player and a compact disc (CD) player to an amplifier, then, during the operation of the record player, holding the CD player under control in a reproduction standby mode, and upon completion of reproducing the music or the like from the record for a predetermined time, switching a selector from the record to the CD, and driving the CD player to reproduce the music from the CD.

Thus, the user is compelled to perform such complicated manipulation and, since continuous switching from a record to a CD cannot be carried out successively, it has been impossible heretofore to achieve perfect evaluation of the reproduced tones which are temporally continuous.

Meanwhile, if audition in sales shops or stores for example can be simplified to facilitate evaluation of the tone qualities obtained from both layers of the multi-layer disc, then a remarkable convenience will be ensured with another advantage of promoting sales.

In comparing the contents of such multi-layer disc, if the 1-bit digital audio signal processed through ΣΔ modulation at 2.842 MHz can be reproduced immediately after the 16-bit digital audio signal sampled at 44.1 kHz is once reproduced for a predetermined time, then the desired aural comparison can be effected in time series successively to thereby attain exact and convenient comparison of the audio qualities.

SUMMARY OF THE INVENTION

It is therefore an object of the present invention to provide a disc reproducing apparatus and a disc reproducing method which enable a user to aurally perceive the difference between audio qualities relative to the two formats mentioned above.

According to an aspect of the present invention, there is provided a disc reproducing apparatus adapted to reproduce a disc which has one layer containing a recorded high-quality digital audio signal and another layer containing a recorded low-quality digital audio signal. The apparatus includes a reproduction device for reproducing the high-quality digital audio signal and the low-quality digital audio signal from one and another layers respectively; a memory for storing the high-quality digital audio signal and the low-quality digital audio signal obtained from the reproduction device; and a memory controller for controlling the memory in such a manner that the high-quality digital audio signal and the low-quality digital audio signals stored in the memory means are alternately read and reproduced therefrom.

And according to another aspect of the present invention, there is provided a disc reproducing method adapted to reproduce a disc which has one layer containing a recorded high-quality digital signal and another layer containing a recorded low-quality digital signal. The method includes the steps of reproducing the high-quality digital signal and the low-quality digital signal from one and another layers respectively; storing the reproduced high-quality digital signal and the reproduced low-quality digital signal in a memory; and controlling the memory in such a manner as to alternately read out the high-quality digital signal and the low-quality digital signal from the memory.

For reproduction of a multi-layer disc having a first layer containing a recorded multi-bit digital signal quantized at a first sampling frequency and a second layer containing a recorded 1-bit digital signal quantized at a second sampling frequency which is higher than the first sampling frequency, the apparatus includes a fist memory for storing a predetermined amount of the audio signal reproduced from one of the first and second layers; a second memory for storing a predetermined amount of the audio signal reproduced from the other layer; and a memory controller for controlling the first and second memories in such a manner as to successively reproduce the audio signals stored in the first and second memories.

More specifically, the data in the first and second layers can be reproduced and outputted successively from the first and second memories, so that the tone qualities of the data recorded respectively in the two layers can be evaluated with facility and simplicity.

Supposing that the programs to be recorded in the first and second layers respectively are the same sound sources and that the audio signal corresponding to the one-layer audio signal stored in the first memory means is reproduced from the other layer and is stored in the second memory means, the same audio contents recorded in the first and second layers respectively are reproduced and outputted in succession to be further adapted for comparison of the tone qualities.

The above and other features and advantages of the present invention will become apparent from the following description which will be given with reference to the illustrative accompanying drawings.

BRIEF DESCRIPTION OF THE DRAWINGS

FIG. 2 is a block diagram of a disc reproducing apparatus according to the present invention;

DESCRIPTION OF THE PREFERRED EMBODIMENTS

Figure 1:
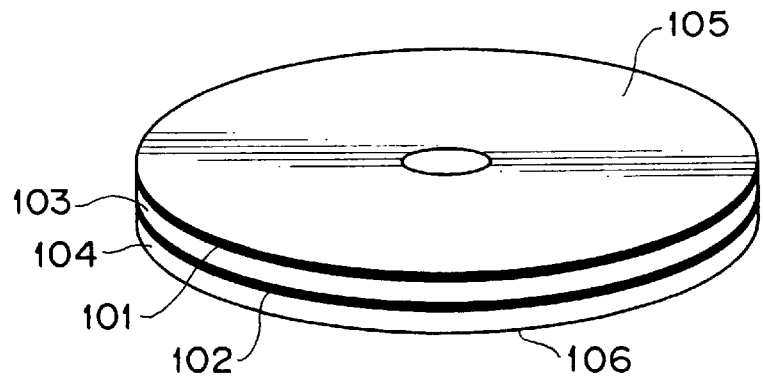
FIG. 1 is a perspective view showing the external appearance of a multi-layer disc adapted for use in the present invention.

Hereinafter some preferred embodiments of the multi-disc reproducing apparatus according to the present invention will be described in detail in the following order.
(1) Structure of multi-layer disc
(2) Configuration of reproducing apparatus
(3) External appearance of reproducing apparatus
(4) Reproduction for comparison of tone qualities
(1) Structure of multi-layer disc FIG. 1 shows an exemplary structure of a multi-layer disc adapted for use in an embodiment representing the reproducing apparatus of the invention.

This multi-layer disc is an optical one having a diameter of about 12 cm and a thickness of 1.2 mm. As illustrated, its layer structure consists of a label plane 105 on the upper side, a CD layer 101, a CD substrate 103, an HD layer 102, an HD substrate 104, and a read plane 106 on the lower side.

As seen in this structure, there are formed two recording layers, i.e., a CD layer 101 and an HD layer 102. One recording layer (CD layer 101) contains a 16-bit digital audio signal sampled at a frequency of 44.1 kHz, as known in an ordinary CD. Meanwhile, the other recording layer (HD layer 102) contains a 1-bit digital audio signal processed through $\Sigma\Delta$ modulation at a very high sampling frequency of 2.842 MHz which is 16 times the foregoing frequency of 44.1 kHz.

A frequency band of 5 to 20 kHz is attained in the CD layer 101, while a wide frequency band of DC component to 100 kHz can be realized in the HD layer 102. A dynamic range of 98 dB is attained in the CD layer 101 over the entire audio band, while that of 120 dB can be realized in the HD layer 102 over the entire audio band.

In the CD layer 101, a minimum pit length is 0.83 $\mu$m; while in the HD layer 102, a minimum pit length is 0.4 $\mu$m.

A track pitch of 1.6 $\mu$m is set in the CD layer 101, while that of 0.74 $\mu$m is set in the HD layer 102.

As for a read laser wavelength, it is set to 780 nm in the CD layer 101, while it is shortened to 650 nm in the HD layer 102.

Further, the numerical aperture (NA) of an optical pickup lens is set to 0.45 for the CD layer 101, while it is set to 0.6 for the HD layer 102.

Thus, due to such changes of the minimum pit length, the track pitch, the numerical aperture NA of the lens and the laser wavelength, the data capacity of the HD layer 102 can be increased to 4.7 GB which is much greater than the data capacity (780 MB) of the CD layer 101, whereby a greater amount of data is rendered recordable.
(2) Configuration of reproducing apparatus FIG. 2 is a block diagram of the disc reproducing apparatus in this embodiment.

An optical disc 1 is either the above-described multi-layer disc or a known compact disc.

This optical disc 1 is placed on an unshown turntable and is rotated under control by a spindle motor 2 at a constant linear velocity (CLV).

An optical head 3 includes unshown components including objective lenses, a biaxial mechanism, semiconductor lasers, and a light sensor which receives the light emitted from the semiconductor laser and reflected by the surface of the optical disc 1.

In case the optical disc placed on the turntable is a multi-layer disc, the optical path is selectively switched so that a semiconductor laser emitting an output wavelength of 780 nm is used for reproducing the CD layer 101 of the disc, and another semiconductor laser emitting a shorter output wavelength of 680 nm is used for reproducing the HD layer 102.

The optical head 3 is equipped with two objective lenses. And the optical path is selectively switched so that one lens having a numerical aperture of 0.45 is used for reproducing the CD layer 101, and another lens having a numerical aperture of 0.6 is used for reproducing the HD layer 102.

In case the loaded optical disc 1 is a compact disc, the ordinary operation for reproducing the CD layer 101 of the multi-layer disc is performed.

If a hologram-integrated aspherical lens is used, it becomes possible to eliminate the necessity of employing two objective lenses in the optical head 3 as mentioned, and merely a single lens is sufficient to meet the requirement with selective switching of the optical path of the semiconductor laser. Therefore, such an optical head may be used as well.

The biaxial mechanism comprises a focus coil for driving the objective lens toward or away from the optical disc 1, and a tracking coil for driving the objective lens in the radial direction of the optical disc 1.

This reproducing apparatus is equipped with a sled motor (not shown) for widely moving the whole optical head 3 in the radial direction of the optical disc 1.

The reflected light detected by the light sensor in the optical head 3 is supplied to an RF amplifier 4, which then executes a current-to-voltage conversion and a matrix calculation to generate a focus error signal FE, a tracking error signal TE, and also an RF signal as reproduced information.

The focus error signal FE and the tracking error signal TE thus generated are applied to the focus coil and the tracking coil, respectively, via a drive circuit 6 after phase compensation and gain control in a servo circuit 5.

Further the tracking error signal TE is processed via an LPF (low pass filter) in the servo circuit 5, wherein a sled error signal is generated and then is applied via the drive circuit 6 to the sled motor.

If the loaded optical disc 1 is a CD, the RF signal generated in the RF amplifier 4 is binary-coded with execution of EFD (eight-to-fourteen demodulation) and is processed for error correction through CIRC (cross interleave Reed-Solomon coding) in an error corrector/decoder 7, and subsequently the processed signal is supplied to a memory controller 8.

Meanwhile, if the loaded optical disc 1 on the turntable is a multi-layer disc, reproduction of its CD layer 101 is performed in the same manner as in the foregoing case of a CD, i.e., the signal is binary-coded with execution of EFD and is processed for error correction through CIRC in the error corrector/decoder 7, and then the processed signal is supplied to the memory controller 8.

In reproducing the HD layer 102 of the multi-layer disc, the signal is binary coded with execution of EFD-plus (eight-to-fourteen demodulation plus) in the error corrector/decoder 7, and is further processed for error correction on the basis of product code.

In the error corrector/decoder 7, the binary EFD or EFD-plus signal is compared with a reference clock to consequently generate a velocity error signal and a phase error signal, which are then supplied to the drive circuit 6 to control the rotation of the optical disc 1 by the spindle motor 2.

Further in the error corrector/decoder 7, the pull-in action of a PLL (phase-locked loop) is controlled in accordance with the binary EFD or EFD-plus signal.

The binary data after the error correction is written in a buffer memory 9 at a predetermined transfer rate via the memory controller 8.

When more than a predetermined amount of the data has been stored in the buffer memory 9, the data is read out therefrom at a second transfer rate which is sufficiently lower than the write transfer rate.

In this manner, the data is once stored in the buffer memory 9 and then is outputted therefrom as audio data so that, despite occurrence of a trouble where the optical head 3 fails to read the data continuously due to a track jump caused by some shock or other disturbance for example, it is still possible to realize a continuous audio data output properly, since the data corresponding to the time required for resetting the optical head 3 to the former address prior to the track jump has already been stored previously in the buffer memory 9.

The operation of the memory controller 8 is under control of a system controller 11.

The digital data read out from the buffer memory 9 by the memory controller 8 is converted by a D-A converter 10 into analog audio signals, which are then delivered as a right channel output and a left channel output.

In response to manipulations of keys provided in a key set 12, the system controller 11 performs various control actions of transferring a servo command to the relevant servo circuit 5, giving an instruction to the memory controller 8 for controlling the buffer memory 9, controlling a display unit 13 to display thereon a play lapse time and character information such as a title of the program being reproduced, or controlling the spindle servo and the decoder executed in the error corrector/decoder 7.

(3) External appearance of reproducing apparatus

Figure 3:
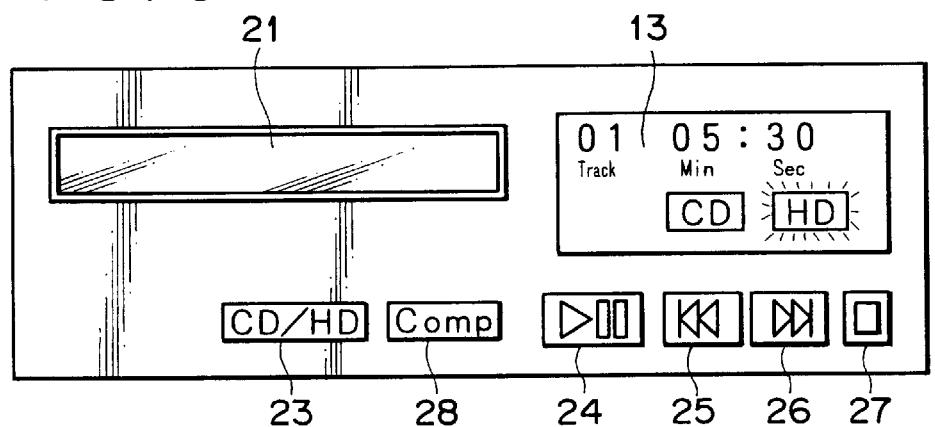
FIG. 3 illustrates the front appearance of the disc reproducing apparatus according to the present invention.

FIG. 3 illustrates the external appearance (front panel) of the reproducing apparatus in this embodiment.

An optical disc 1 is placed on a tray 21 and is inserted into the reproducing apparatus.

On a display unit 13, there are displayed a track number, a play time of a music piece or the like being reproduced, and an indication representing either a CD layer 101 (or CD) or an HD layer 102 being currently reproduced.

Manipulation keys constituting the aforementioned key set 12 are provided as illustrated.

A CD/HD key 23 is manipulated for selecting the desired layer to be reproduced in case a multi-layer disc is loaded.

A Comp key 28 is a unique manipulation member relative to the characteristic operation of the embodiment.

When the Comp key 28 is manipulated, the memory controller 8 and so forth are actuated under control of the system controller 11, so that the 16-bit digital audio signal sampled at 44.1 kHz and recorded in one layer (CD layer 101) of the multi-layer disc is reproduced and stored for a predetermined time in the buffer memory 9, and subsequently the 1-bit digital audio signal processed through $\Sigma\Delta$ modulation at a sampling frequency of 2.842 MHz and recorded in the other layer (HD layer 102) is reproduced and stored in the buffer memory 9. Thereafter the audio signals of the two different formats stored in the buffer memory 9 are read out therefrom successively and are outputted as reproduced data. The procedure of this operation will be described in detail later.

In this embodiment, any particular memory for the above operation need not be incorporated in the reproducing apparatus due to the use of the buffer memory 9. However, it is a matter of course that an exclusive memory may be provided as well.

As shown in FIG. 3, the reproducing apparatus further has other manipulation members including a play/pause key 24, AMS (auto music sensor) keys 25 and 26 for selecting a desired program, and a stop key 27.

(4) Reproduction for comparison of tone qualities

Figure 4:
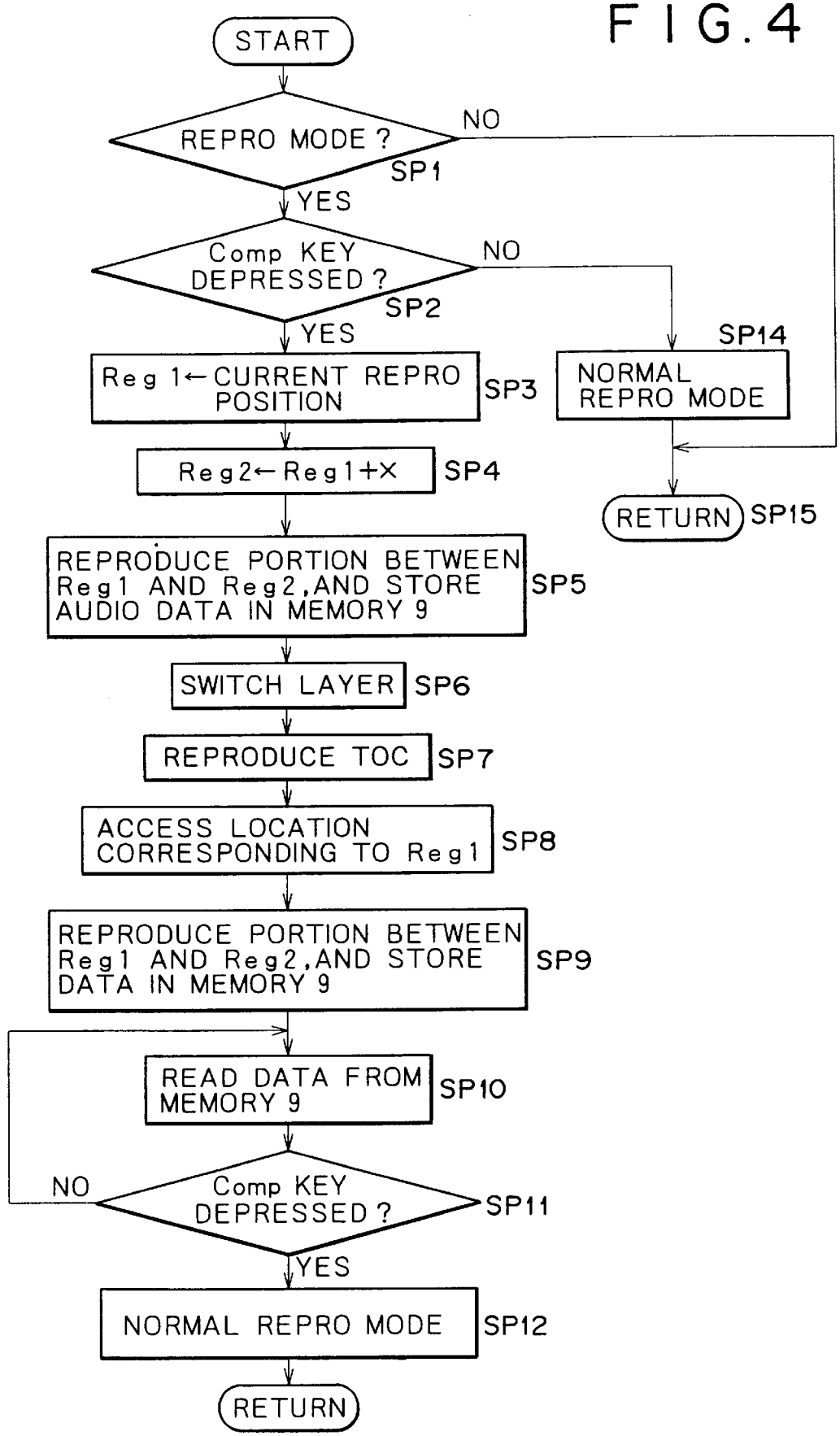
FIG. 4 is a flowchart of a processing routine executed in the disc reproducing apparatus of the present invention.

FIG. 4 is a flowchart showing a processing routine which is executed to reproduce the data for comparison of the tone qualities realized in the reproducing apparatus of this embodiment. This flowchart shows a control processing routine by the system controller 11.

At step SP1, the system controller 11 makes a decision as to whether the apparatus is in a reproduction mode or not. And if the result of the above decision signifies a reproduction mode, another decision is made at step SP2 as to whether the Comp key 28 has been depressed or not. If the result of this decision is negative to signify no depression, the normal reproduction is performed continuously (step SP14).

Meanwhile, if the result of the decision at step SP2 is affirmative to signify depression of the Comp key 28, the address on the disc 1 relative to the data reproduced at the time of such depression is stored in the register Reg1 at step SP3.

Subsequently at step SP4, a predetermined offset value X is added to the address stored in the register Reg1, and the result of such addition is stored in the register Reg2.

The offset value X is determined to have an address length corresponding to, e.g., five seconds or so of the reproduced audio data. It follows therefore that the address in the register Reg2 corresponds to that of the data reproduced after a lapse of five seconds from the address of the relevant reproduction stored in the register Reg1.

It is to be understood here that the offset value X is not limited merely to five seconds alone, and any appropriate time length may be preset for comparison of the tone qualities.

Subsequently at step SP5, the portion between the start address and the end address stored respectively in the registers Reg1 and Reg2 is reproduced from the layer that has been in the reproduction mode, and the audio data thus reproduced is stored in the buffer memory 9.

Upon completion of reproducing the portion between the start address and the end address stored respectively in the registers Reg1 and Reg2, the layer that has been in the reproduction mode is switched to the other layer at step SP6.

More specifically, the layer switching control is executed for switching the relevant servo to the selected layer for focus, switching the optical path of the optical pickup, or switching the signal processing line of the error corrector/decoder 7.

After execution of the layer switching process, first the TOC (table of content) data in a management area is reproduced at step SP7, and according to the TOC data thus obtained, an access is made at step SP8 under control to the location corresponding to the address stored in the register Reg1.

Subsequently at step SP9, the audio data of the other layer, which has the same content as that of the data stored already in the buffer memory 9 with the start address and the end address stored respectively in the registers Reg1 and Reg2, is stored in another area of the buffer memory 9.

Due to the control mentioned above, the audio data of a predetermined time in one layer (e.g., CD layer 101) and the audio data of a predetermined time in the other layer (e.g., HD layer 102) are both stored in the buffer memory 9.

And after completion of the process for storing the audio data of the two layers in the buffer memory 9, the data begin to be read out from the buffer memory 9 at step SP10.

A decision is made at step SP11 as to whether the Comp key 28 has been depressed again or not during the data reading from the buffer memory 9, and if the result of this decision is negative to signify no depression, the process of reading the data from the buffer memory 9 is repeated.

More specifically, the audio data of the predetermined time reproduced from, e.g., the CD layer 101 and stored in the buffer memory 9 is read out therefrom and then is outputted as reproduced data, and subsequently the audio data of the predetermined time reproduced from the HD layer 102 and stored in the buffer memory 9 is read out therefrom and then is outputted as reproduced data. And further after completion of such process, the foregoing operation is performed repeatedly in such a manner that the audio data of the predetermined time reproduced from the CD layer 101 and stored in the buffer memory 9 is read out therefrom and then is outputted as reproduced data.

That is, until another depression of the Comp key 28 is detected at step SP11, the data of the CD layer 101 and that of the HD layer 102 stored in the buffer memory 9 are reproduced and outputted alternately and repeatedly.

Therefore, it becomes possible for the user to distinctly recognize the difference between the tone qualities of the data obtained from the two layers with respect to the audio outputs of the same contents, hence achieving proper comparison of the tone qualities and exact evaluation thereof with accuracy and simplicity.

If the result of the decision at step SP11 is affirmative to signify that the Comp key 28 has been depressed again during the data reading from the buffer memory 9, the operation of reading out the audio data from the buffer memory 9 is brought to a stop and then proceeds to normal reproduction (step SP12). That is, the buffer memory 9 is used as an essential buffer memory, and the data read from the disc 1 and decoded is delivered via the buffer memory 9 as a reproduced output.

During the process of sequentially reading the data of the two layers from the buffer memory 9 at step SP10, the operation of the optical head 3 for reproduction from the optical disc 1 is held in a stop mode or a pause mode. Consequently, the power consumption can be reduced by thus holding the optical head 3 in a stop or pause mode.

For example, a pause mode or a complete stop mode may be kept on at the address stored in the register Reg1 or Reg2. In the pause mode thus kept on, when the Comp key 28 is depressed again at step SP11, a transition to normal reproduction can be executed smoothly. That is, the operation is enabled to proceed to normal reproduction immediately without the necessity of starting up the servo system and so forth.

With regard to selective setting of the layer when the pause or stop mode is kept on, a state corresponding to the layer that has been in the reproduction mode prior to the depression of the Comp key 28 at step SP2 may be set for example. However, the other layer (selected at step SP6) may be left unchanged.

A modification may be so contrived that, during sequential read of the data of the two layers from the buffer memory 9, the respective original recording layers of the reproduced output data are displayed in a manner recognizable by the user.

More specifically, the CD element in the display unit 13 shown in FIG. 3 is turned on during the time period in which the data of the CD layer is read out from the buffer memory 9 and is reproduced, whereas the HD element is turned on during the time period in which the data of the HD layer is read out and reproduced.

Figure 5:
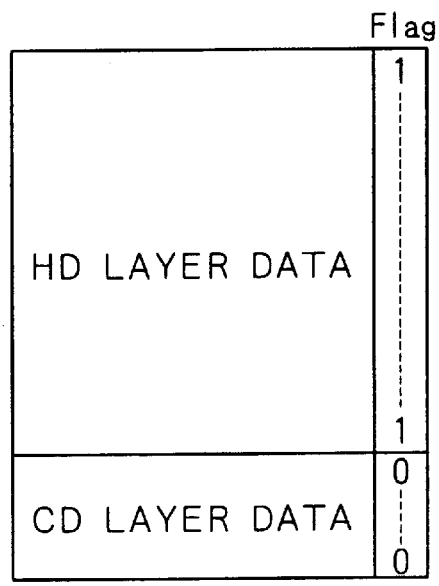
FIG. 5 is a typical view of data stored in memories employed in the present invention.

In this case, when reading the audio data at step SP5 or SP9 (and storing the data in the buffer memory 9), a flag indicating the kind of each data-recorded layer is additionally attached to the relevant audio data as shown in FIG. 5 and then is stored in the buffer memory 9. It is so defined that, for example, a flag "1" indicates the data of the HD layer, and a flag "0" indicates the data of the CD layer, respectively.

In the present invention, the 16-bit quantized digital audio signal processed at a sampling frequency of 44.1 kHz is recorded in the CD layer, and the 1-bit quantized digital audio signal processed at a sampling frequency of 2.842 MHz (44.1 kHz×64 times) is recorded in the HD layer. Therefore, if the data of the same content are stored, a relationship of CD:HD=1:4 is obtained, as shown in FIG. 5. That is, the data of the HD layer is four times greater, as obvious from a calculation of 44.1×16/44.1×64×1=¼.

When reading out the data from the buffer memory 9 at step SP10, the system controller 11 discriminates each flag relative to the audio data thus read, and turns on either the CD element or the HD element in the display unit 13 according to the result of such discrimination. Consequently, in evaluation of the tone quality by a blind test, it becomes possible for a questioner to always grasp which one of the layers is being currently reproduced.

However, none of such flags is necessary in case the system controller 11 can identify the original recording layer with regard to the stored data, e.g., in case a storage area is preset correspondingly to each layer or in case an exclusive memory for each layer is incorporated.

Although the present invention has been described hereinabove with reference to the preferred embodiment, it is to be noted that the invention is not limited thereto alone, and a variety of other modifications and ranges of application may be contrived.

For example, the aforementioned embodiment represents an example where a 16-bit digital audio signal processed at a sampling frequency of 44.1 kHz is recorded in one layer of a dual-layer disc, while a 1-bit digital audio signal processed at a sampling frequency of 2.842 MHz through $\Sigma\Delta$ modulation is recorded in the other layer. However, the above may be so modified that, for example, a 16-bit digital audio signal processed at a sampling frequency of 44.1 kHz is recorded in one layer of the dual-layer disc, while an m-bit (where m=greater than 17) digital audio signal quantized at a sampling frequency of 48×n kHz (where n=integer greater than 2) is recorded in the other layer.

The number of layers is not limited merely to two alone, and another modification may be so contrived as to employ a multi-layer disc having three or more layers, wherein digital audio signals processed at different sampling frequencies with different numbers of quantization bits are recorded in such multiple layers.

In a further modification, still or moving images obtained at a low data compression rate are recorded in a first layer, while still or moving images obtained at a high data compression rate are recorded in a second layer, and the same images are reproduced from the two layers respectively and then are stored in a memory. Subsequently, the still or moving image of the low data compression rate and that of the high data compression rate are reproduced alternately from the memory, and the images thus reproduced are compared mutually.

In this case, the data compression relative to such moving images may be carried out in conformity with the MPEG1 (Moving Picture Experts Group) and MPEG2 standards.

According to the present invention, as described above, the data recorded in one layer of a multi-layer disc (e.g., 16-bit digital audio signal sampled at 44.1 kHz) is reproduced for a predetermined time, and then the data recorded in the other layer (e.g., 1-bit digital audio signal sampled at 2.842 MHz through $\Sigma\Delta$ modulation) is reproduced for a predetermined time. Since such operation is performed repeatedly, it becomes possible for the user to distinctly recognize the aural difference between the data of the two layers, hence achieving an advantageous effect that the tone quality difference can be perceived exactly.

Particularly in a multi-layer disc where data of the same content are recorded in its individual layers in different formats, the mutually corresponding portions of the same program, i.e., the data of the same content, can be reproduced continuously in time series, so that the user is enabled to attain more distinct recognition of the tone quality difference, since an independent comparison of the tone qualities is realized without depending on any genre of music sources or the like.

Furthermore, due to the feature that the data are once stored in the first and second memory means and then are read out therefrom to be delivered as reproduced outputs, none of inter-track soundless portion is generated despite the action of switching accesses to the disc or switching the layers for reproduction, thereby ensuring satisfactory evaluation of the audio signals reproduced continuously in time series.

What is claimed is:

1. A disc reproducing apparatus for reproducing a disc which has one layer containing a recorded high-quality digital signal and another layer containing a recorded low-quality digital signal, said apparatus comprising:

reproduction means for reproducing the high-quality digital signal from said one layer and the low-quality digital signal from said another layer;

memory means for storing the high-quality digital signal and the low-quality digital signal obtained from said reproduction means; and memory control means for alternately reading and reproducing the high-quality digital signal and the low-quality digital signal stored in said memory means thereby causing a difference between the high-quality digital signal and the low-quality digital signal.

2. The disc reproducing apparatus according to claim 1, wherein said low-quality digital signal is a multi-bit quantized digital audio signal sampled at a frequency of 44.1 kHz.

3. The disc reproducing apparatus according to claim 1, wherein said high-quality digital signal is a 1-bit quantized digital audio signal sampled at a frequency of 44.1×n kHz, where n is an integer greater than or equal to 2.

4. The disc reproducing apparatus according to claim 1, further comprising control means for controlling and holding said reproduction means in one of a stop mode and a standby mode during a period in which the high-quality digital signal and the low-quality digital signal are alternately read and reproduced from said memory means.

5. The disc reproducing apparatus according to claim 1, wherein the high-quality digital signal and the low-quality digital signal stored in said memory means have the same content.

6. The disc reproducing apparatus according to claim 1, further comprising: manipulation means for commanding said memory means to store the high-quality digital signal and the low-quality digital signal; and address storage means for storing an address of the high-quality digital signal from said one layer scanned by said reproduction means at the time of actuation of said manipulation means; wherein a predetermined amount of the digital signal is stored in said memory means starting at the address stored in said address storage means, and after completion of storage in said memory means, a predetermined amount of the digital signal is stored in said memory means starting at the address of the low-quality digital signal from said another layer corresponding to said address stored previously in said address storage means.

7. The disc reproducing apparatus according to claim 1, wherein said low-quality digital signal is a digital image signal obtained at a high compression rate, and said high-quality digital signal is a digital image signal obtained at a low compression rate.

8. The disc reproducing apparatus according to claim 1, further comprising display means for discriminably displaying which of the high-quality digital signal contained in said one layer and the low-quality digital signal contained in said another layer is being currently reproduced by said reproduction means.

9. A method of reproducing a disc which has one layer containing a recorded high-quality digital signal and another layer containing a recorded low-quality digital signal, said method comprising the steps of:

reproducing the high-quality digital signal from said one layer and the low-quality digital signal from said another layer;

storing the reproduced high-quality digital signal and the reproduced low-quality digital signal in a memory; and controlling said memory to provide for the high-quality digital signal and the low-quality digital signal to be read out of said memory alternately thereby causing a difference between the high-quality digital signal and the low-quality digital signal.

10. The disc reproducing method according to claim 9, wherein said low-quality digital signal is a multi-bit quantized digital audio signal sampled at a frequency of 44.1 kHz.

11. The disc reproducing method according to claim 9, wherein said high-quality digital signal is a 1-bit quantized digital audio signal sampled at a frequency of 44.1×n kHz, where n is an integer greater than or equal to 2.

12. The disc reproducing method according to claim 9, further comprising a step of holding the signal reproduction from the disc in one of a stop mode and a pause mode during a period in which the high-quality digital signal and the low-quality digital signal are alternately read and reproduced from said memory.

13. The disc reproducing method according to claim 9, wherein the high-quality digital signal and the low-quality digital signal stored in said memory have the same content.

14. The disc reproducing method according to claim 9, wherein said low-quality digital signal is a digital image signal obtained at a high compression rate, and said high-quality digital signal is a digital image signal obtained at a low compression rate.

* * * * *